United States Patent
Dunn

(10) Patent No.: US 12,370,731 B2
(45) Date of Patent: *Jul. 29, 2025

(54) REINFORCED WOOD FIBER CORE AND METHOD OF MAKING THEREOF

(71) Applicant: Souhegan Wood Products Inc., Wilton, NH (US)

(72) Inventor: Randolph A Dunn, Wilton, NH (US)

(73) Assignee: Souhegan Wood Products Inc., Wilton, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,797

(22) Filed: Aug. 28, 2023

(65) Prior Publication Data

US 2023/0405904 A1   Dec. 21, 2023

Related U.S. Application Data

(63) Continuation of application No. 16/993,465, filed on Aug. 14, 2020, now Pat. No. 11,772,315.

(60) Provisional application No. 62/886,569, filed on Aug. 14, 2019.

(51) Int. Cl.
  *B29C 48/00* (2019.01)
  *B29C 48/09* (2019.01)
  *B29C 63/18* (2006.01)
  *B65H 75/10* (2006.01)

(52) U.S. Cl.
  CPC ...... *B29C 48/0021* (2019.02); *B29C 48/0022* (2019.02); *B29C 48/09* (2019.02); *B29C 63/18* (2013.01); *B65H 75/10* (2013.01); *B29C 2793/0063* (2013.01); *B29C 2793/009* (2013.01); *B65H 2401/10* (2013.01)

(58) Field of Classification Search
  CPC . B29C 48/0021; B29C 48/0022; B29C 48/09; B29C 63/18; B29C 2793/0063; B29C 2793/009; B65H 75/10; B65H 2401/10
  See application file for complete search history.

(56) References Cited

U.S. PATENT DOCUMENTS

| | | | |
|---|---|---|---|
| 1,015,244 | A | 1/1912 | Parker |
| 1,753,342 | A | 4/1930 | Hubbard |
| 1,881,911 | A | 10/1932 | Parker |
| 2,365,980 | A | 12/1944 | Thomas |

(Continued)

FOREIGN PATENT DOCUMENTS

| | | |
|---|---|---|
| DE | 4206143 A1 | 9/1993 |
| EP | 605914 A1 | 7/1994 |

(Continued)

OTHER PUBLICATIONS https://web.archive.org/web/20170627173308/https://souheganwood.com/products/belt-winding-cores/ (Publication Jun. 27, 2017).*

(Continued)

*Primary Examiner* — Vishal I Patel
(74) *Attorney, Agent, or Firm* — Maine Cernota & Curran

(57) ABSTRACT

A winding core with improved beam and hoop strength and diminished friability and method for manufacturing such a core are provided, the method for making the winding core comprising: providing a wood fiber core, applying an adhesive to the wood fiber core, and sliding a tube or sheath onto the wood fiber core.

15 Claims, 6 Drawing Sheets

(56) References Cited

U.S. PATENT DOCUMENTS

| | | | |
|---|---|---|---|
| 2,748,805 | A | 6/1956 | Winstead |
| 2,977,066 | A | 3/1961 | Kimmel |
| 3,447,996 | A | 6/1969 | Himmelheber et al. |
| 3,807,458 | A | 4/1974 | Royston |
| 4,034,932 | A | 7/1977 | Ferch |
| 4,157,181 | A | 6/1979 | Cecka |
| 4,166,432 | A | 9/1979 | Moore |
| 4,179,269 | A | 12/1979 | Yates et al. |
| D255,664 | S | 7/1980 | Wahl |
| 4,361,530 | A | 11/1982 | Peer |
| 4,391,898 | A | 7/1983 | Van der Velden |
| 4,701,373 | A | 10/1987 | Fuchs et al. |
| 4,810,255 | A | 3/1989 | Fay, III et al. |
| 4,980,214 | A | 12/1990 | Charriere |
| 5,147,722 | A | 9/1992 | Koslow |
| 5,165,543 | A | 11/1992 | Heyda |
| D345,930 | S | 4/1994 | Lewis |
| 5,585,155 | A | 12/1996 | Heikkila et al. |
| 6,007,656 | A | 12/1999 | Heikkila et al. |
| 6,083,601 | A | 7/2000 | Prince et al. |
| 6,106,944 | A | 8/2000 | Heikkila et al. |
| 6,319,457 | B1 | 11/2001 | DuCharme, Jr. et al. |
| D532,714 | S | 11/2006 | Scharr |
| 7,270,279 | B2 | 9/2007 | Monk |
| 7,357,726 | B2 * | 4/2008 | Thorning ............... B29C 70/86 |
| | | | 470/14 |
| D581,568 | S | 11/2008 | Bertken |
| D670,156 | S | 11/2012 | Crooks |
| D676,170 | S | 2/2013 | Feng |
| D780,115 | S | 2/2017 | Huang |
| 9,777,891 | B2 | 10/2017 | Kawabata |
| D813,155 | S | 3/2018 | Yamada |
| D833,492 | S | 11/2018 | Stevens |
| 11,772,315 | B1 * | 10/2023 | Dunn ............... B29C 48/0021 |
| | | | 156/244.12 |
| 2002/0066824 | A1 | 6/2002 | Floyd |
| 2002/0094431 | A1 | 7/2002 | Roderick et al. |
| 2002/0106178 | A1 | 8/2002 | Bumgerner |
| 2004/0126515 | A1 | 7/2004 | Yarmoska |
| 2005/0015986 | A1 | 1/2005 | Stebnicki et al. |
| 2005/0049329 | A1 | 3/2005 | Faulkner |
| 2005/0133951 | A1 | 6/2005 | Muller et al. |
| 2005/0237199 | A1 | 10/2005 | Bellum |
| 2006/0262518 | A1 | 11/2006 | Thuma |
| 2008/0156234 | A1 | 7/2008 | van de Camp |
| 2009/0110842 | A1 | 4/2009 | Vinden et al. |
| 2009/0145994 | A1 * | 6/2009 | Dunn ..................... B65H 75/10 |
| | | | 242/443 |
| 2009/0264560 | A1 | 10/2009 | Warnes |
| 2010/0236172 | A1 | 9/2010 | Wirth |
| 2011/0177265 | A1 * | 7/2011 | Dunn ..................... B32B 5/02 |
| | | | 156/185 |
| 2016/0090268 | A1 * | 3/2016 | Dunn ..................... B65H 75/50 |
| | | | 156/191 |

FOREIGN PATENT DOCUMENTS

| | | |
|---|---|---|
| EP | 747205 A2 | 12/1996 |
| EP | 1250995 A1 | 10/2002 |
| GB | 723426 A | 2/1955 |
| GB | 901519 A | 7/1962 |
| GB | 1471181 | 4/1977 |
| JP | 08-090691 | 4/1996 |
| JP | 3353202 | 11/1999 |
| JP | 2000-034802 | 2/2000 |
| JP | 2002-115701 | 4/2002 |

OTHER PUBLICATIONS

Souheganwood.*

Bushblock Fuel Logs Help the Cheetah's Cause, CCF Bush Party, Ltd., retrieved online <www.cheetah.org/?nd=ccf_bush_Project>, retrieved on Oct. 1, 2010, 5 pages.

FM200 Floor Back and Side Wrap, retrieved online <www.cheaponsale.com/d-p11216434113935>, retrieved on Oct. 1, 2010, 3 pages.

Office Action for U.S. Appl. No. 12/328,800 mail date Dec. 28, 2009, 8 pages.

Office Action for U.S. Appl. No. 12/328,800 mail date Jul. 21, 2010, 6 pages.

PCT Search Report dated Sep. 29, 2011 of Patent Application No. PCT/US2011/021675 filed Jan. 19, 2011.

Penta Profiles Furniture Components, retrieved online <www.pentaprofiles.com/about-us.htm>, retrieved on Oct. 1, 2010, 1 page.

Belt-Winding Cores—entire industries revolve around them: Metal End Caps, Reinforcement for repeated use, posted unknown, [retrieved Oct. 15, 2019]. Retrieved from Internet, <URL: http://souheganwood.com/products/belt-winding-cores/>.

Office Action for U.S. Appl. No. 14/865,289, dated Aug. 28, 2020, 13 Pages.

Office Action for U.S. Appl. No. 14/865,289, dated Apr. 14, 2021, 13 Pages.

Office Action for U.S. Appl. No. 17/060,512, dated Oct. 1, 2021, 12 Pages.

Office Action for U.S. Appl. No. 17/074,060 dated Dec. 2, 2021, 12 Pages.

Notice of Allowance for U.S. Appl. No. 17/074,060 mail date Sep. 14, 2022, 7 pages.

Office Action for U.S. Appl. No. 16/993,465 mail date Oct. 13, 2022, 28 pages.

https://web.archive.org/web/20170627173308/https://souheganwood.corn/products/belt-winding-cores/ (Publication Jun. 27, 2017).

Notice of Allowance for U.S. Appl. No. 16/993,465 mail date May 31, 2023, 7 pages.

* cited by examiner

REINFORCED WOOD FIBER CORE AND METHOD OF MAKING THEREOF

RELATED APPLICATIONS

This application is a continuation of U.S. application Ser. No. 16/993,465, filed Aug. 14, 2020, which claims the benefit of U.S. Provisional Application No. 62/886,569, filed Aug. 14, 2019. Both of these applications are herein incorporated by reference in their entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to extruded wood fiber winding cores, and more particularly, to an extruded wood fiber winding core equipped with a rigid paperboard coating.

BACKGROUND OF THE INVENTION

Wood fiber cores are used to support rolls of various materials. Its limited beam strength and durability, however, have hindered its adoption in some industries like industrial belt winding, where the significant weight of the material wound about a core has traditionally been considered to require a steel core. Such steel cores are custom welded geographically close to the place where they will be used since they are bulky and awkward to transport. They are thus very costly.

Other industries, like light weight high tech non-woven materials have rejected such cores due to the friability of the wood fiber material. Dislodged material may damage the non-woven textile.

What is needed, therefore, are techniques for producing a light weight, non-friable, industrial core with a smooth exterior and high beam strength.

SUMMARY OF THE INVENTION

One embodiment of the present invention provides a method for making a wood fiber belt winding core by extruding a wood fiber core and then applying an adhesive to the exterior of the wood fiber core. A sheath is then slid over the exterior of the wood fiber core.

Another embodiment of the present invention provides clamping the sheath to the wood fiber core and allowing the adhesive to cure.

Another embodiment of the present invention provides cutting a longitudinal notch into the wood fiber core and sheath.

Yet another embodiment of the present invention provides affixing end caps and plates to the ends of the wood fiber core and sheath.

Even another embodiment of the present invention provides applying a finish to the exterior surface of the wood fiber core and/or sheath.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
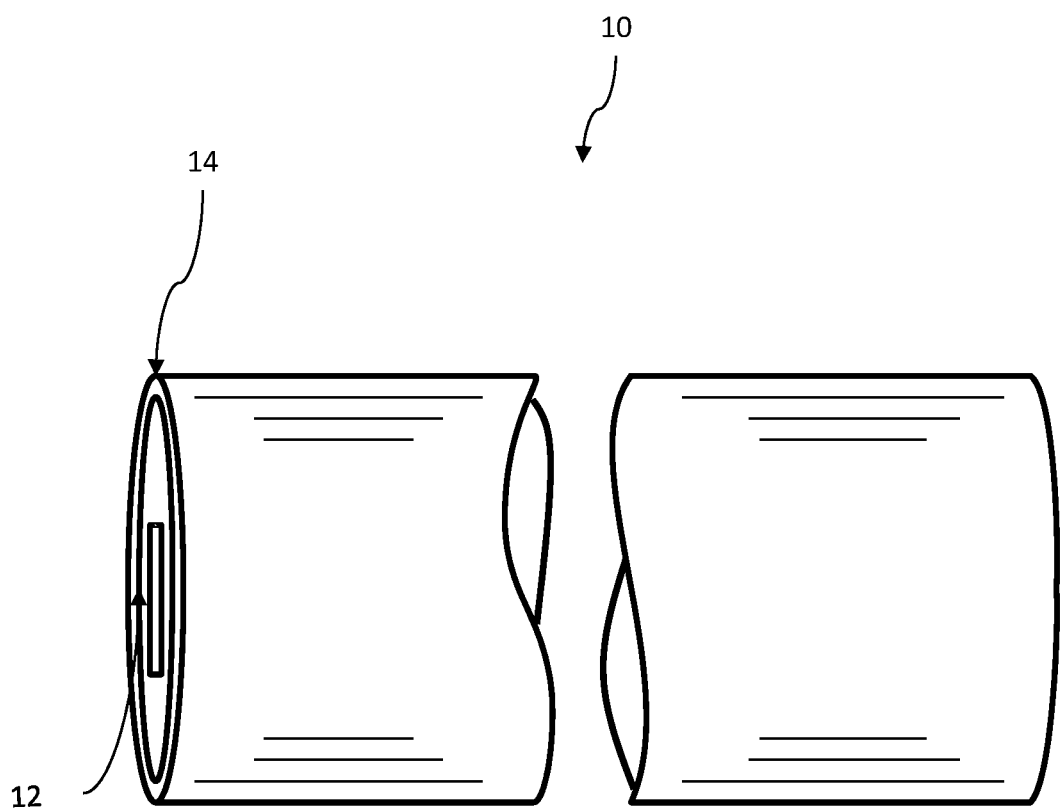
FIG. 1 is a prospective drawing illustrating a structural cylinder having a web shell configured in accordance with one embodiment of the present invention.
Figure 2:
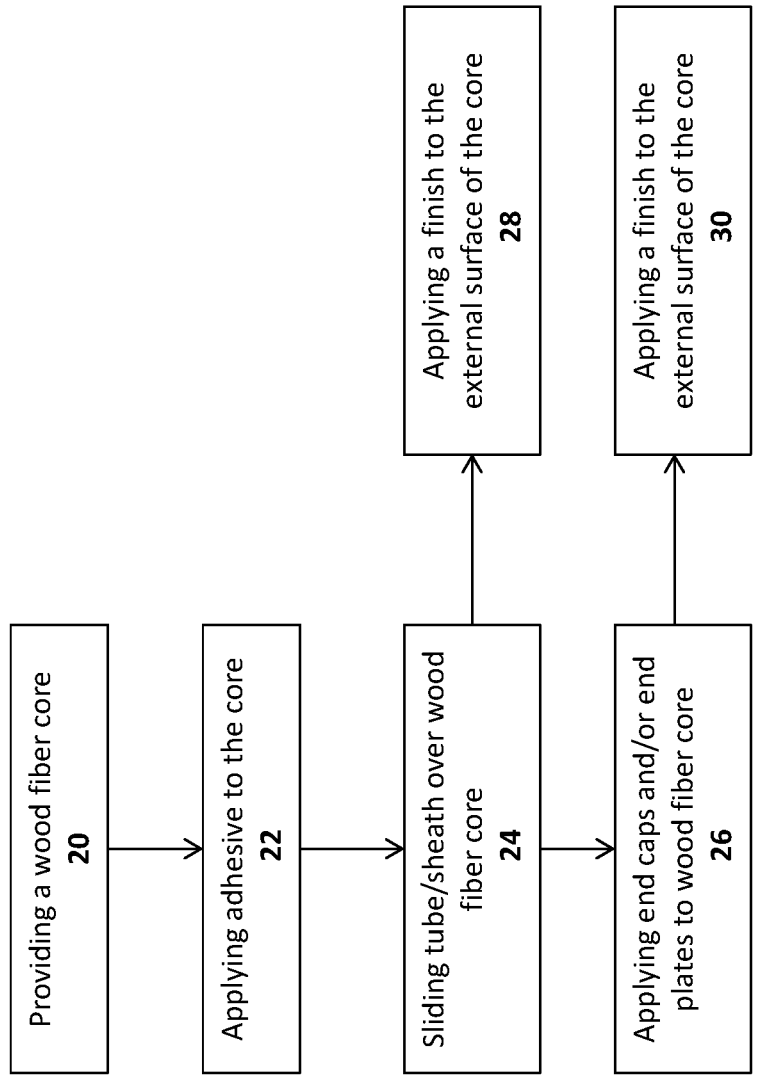
FIG. 2 is a flow chart for a method of making the wood fiber winding core.
Figure 8:
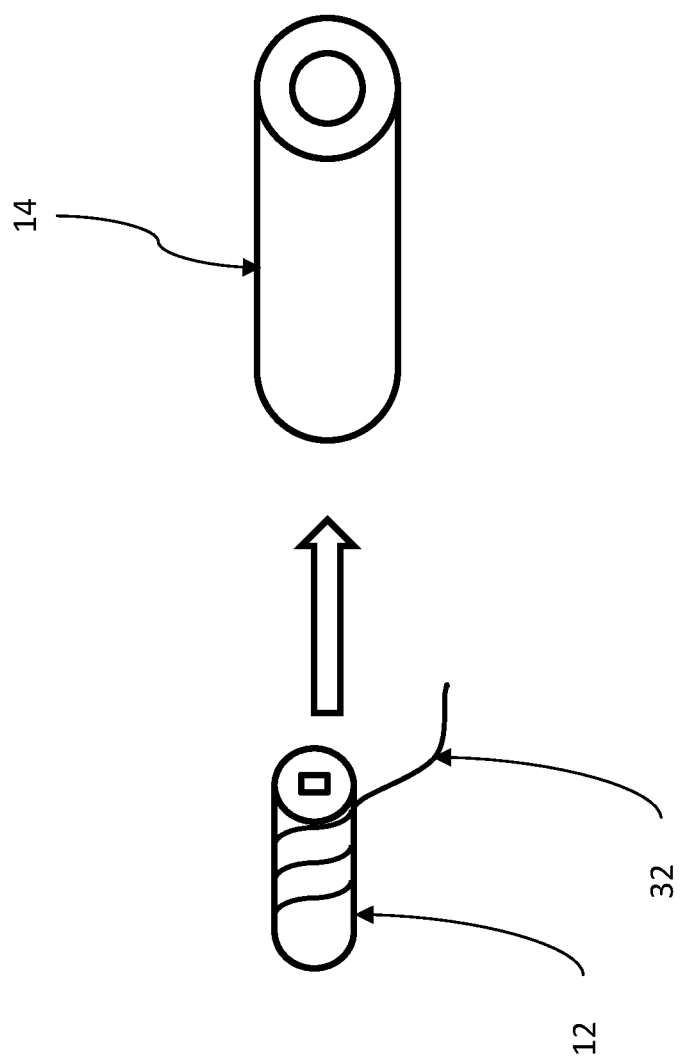
FIG. 8 is a diagram of a method of making the wood fiber winding core that has a longitudinal notch preformed using a filament to ease the passage of a core into a sheath.

In one embodiment of the present invention, as illustrated in FIG. 1, a wood fiber winding core 10, such as those that have been manufactured by the applicant's company since 1963, has a wood fiber core 12 and tube or sheath 14 applied to the outside of the wood fiber core 12. Referring now to FIG. 2, in such an embodiment the wood fiber core is extruded 20, an adhesive may be applied to the core 22, and a tube or sheath may be slid onto the wood fiber core 24. The tube or sheath 14 may be made out of cardboard, corrugated paper, spiral-wound paper, laminated paper, plastic, wound tape, or any material of similar properties. The paper tube may be slid on manually, or with the aid of a mechanical mechanism such as filament 32 wrapped spirally around the core (as illustrated in FIG. 8), filament wrapped coaxially around the core in a "ladder" formation, tubes aligned parallel to the major axis of the core, spherical bearings aligned on the exterior surface of the core, hydraulic rams, increasing the air pressure between the core and the tube/sheath, utilizing mechanical come alongs, utilizing lubricants, or any similar mechanism or method. The tube or sheath may be affixed to the outside of the wood fiber core by applying a resin, glue, or adhesive to the wood fiber core, and sliding the tube or sheath over the wood fiber core while applying longitudinal pressure.

In embodiments using glues as adhesives, one or more may be applied to the exterior of the shell. Examples of glues that may be used are urethane glue, polyurethane glue, cyanoacrylate glue, double sided tape, epoxy, wood glue, spray adhesive, super glue, acrylic adhesives, adhesive gel, or any comparable material. In such embodiments the glue will expand and form a stronger bond between wood fiber core and sheath.

In one embodiment, end caps and plates may be applied to the ends of the wood fiber core and tube/sheath described above 26.

In one embodiment, the wood fiber core may have a tube/sheath applied and then a finish applied to the external surface 28. The finish can be polyurethane, linseed oil, tung oil, lacquer, shellac wax, or any similar finish or material. The finish can improve the core's resistance to water, dust, and friability. These advantages are not intended to be exhaustive, and are only provided to aid in understanding suitable materials for the finish.

In one embodiment, the end caps and plates described above can be applied to the wood fiber core and then a finish such as polyurethane, linseed oil, tung oil, lacquer, shellac wax, or any similar finish or material can be applied to the core with the tube/sheath 30.

Figure 4:
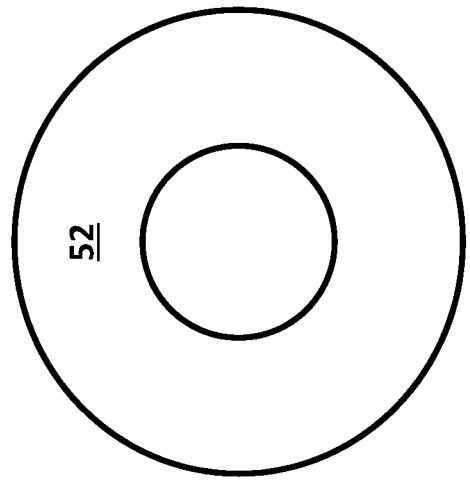
FIG. 4 is a prospective drawing illustrating an end plate with a circle bore shape.
Figure 5:
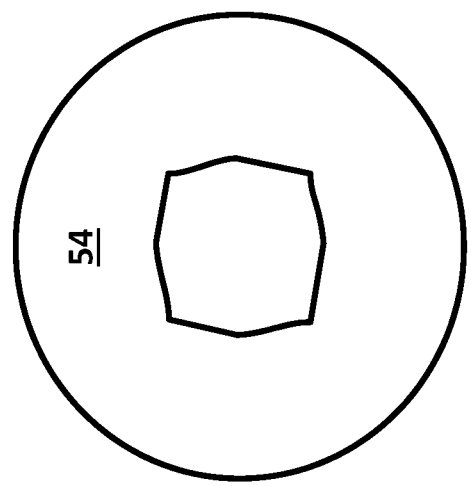
FIG. 5 is a prospective drawing illustrating an end plate with a circle-square bore shape.
Figure 3:
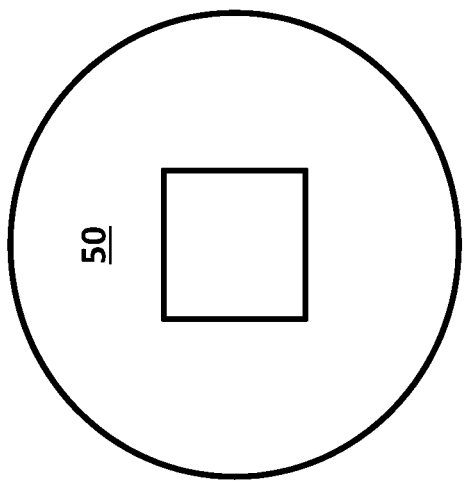
FIG. 3 is a prospective drawing illustrating an end plate with a square bore shape.

In embodiments that have end caps and plates applied to the ends of the wood fiber core, the end caps and plates can be made out of steel, sheet metal, plastic, carbon fiber, or any other similar material. The plate may have a square bore 50 (As seen in FIG. 3), a circular bore 52 (As seen in FIG. 4), a combined circle-square bore shape 54 (As seen in FIG. 5), termed, "squircle"; (a shape of bore of combined concentric and centered square and circle bores such that the circle's diameter is longer than the side of the square but smaller than that of the square's diagonal); or any similar shaped plate. The plate and end cap can be applied to the ends of the wood fiber core and tube/sheath with screws, nails, bolts, adhesives, or any comparable method or combination of methods.

Figure 6:
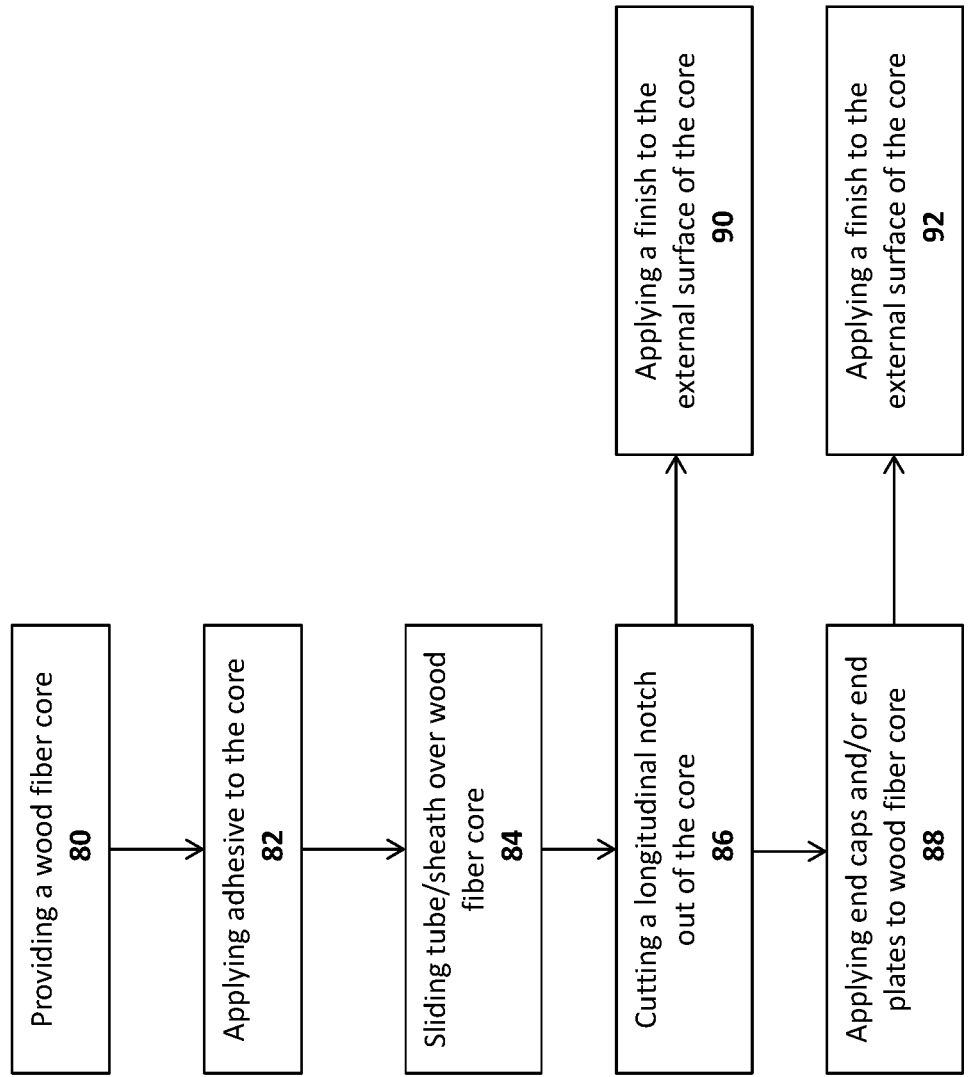
FIG. 6 is a flow chart for a method of making the wood fiber winding core that has a longitudinal notch cut out.

In one embodiment, the wood fiber core is extruded 80 (FIG. 6), an adhesive may be applied to the core 82, and a tube/sheath may be slid onto the core 84. A longitudinal notch extending the length of the core may then be cut out of the core 86 making the exterior surface of the core an involute spiral. The depth of the notch can vary as to permit the winding of various materials with different thicknesses. The notch may be cut out of the core with a chisel, hand saw, circular saw, power planar, hand-held rotary tool, oscillating tool, reciprocating saw, grinding wheel, or any similar tool or method.

In one embodiment, end caps and plates may be applied to the ends of the wood fiber core and tube/sheath with the notch cut out as described above 88. The end caps and plates can be made out of steel, sheet metal, plastic, carbon fiber, or any other similar material. The plate may have a square bore 50 (As seen in FIG. 3), a circular bore 52 (As seen in FIG. 4), a combined circle-square bore shape 54 (As seen in FIG. 5), termed, "squircle"; (a shape of bore of combined concentric and centered square and circle bores such that the circle's diameter is longer than the side of the square but smaller than that of the square's diagonal); or any similar shaped plate. The plate and end cap can be applied to the ends of the wood fiber core and tube/sheath with screws, nails, bolts, adhesives, or any comparable method or combination of methods.

In one embodiment, the wood fiber core with tube/sheath and the notch cut out may have a finish applied to the external surface 90. The finish can be polyurethane, linseed oil, tung oil, lacquer, shellac wax, or any similar finish or material. The finish can improve the core's resistance to water, dust, and friability. These advantages are not intended to be exhaustive, and are only provided to aid in understanding suitable materials for the finish.

In one embodiment, the end caps and plates described above can be applied to the wood fiber core with notch cut out and then a finish such as polyurethane, linseed oil, tung oil, lacquer, shellac wax, or any similar finish or material can be applied to the core with the tube/sheath 92.

Figure 7:
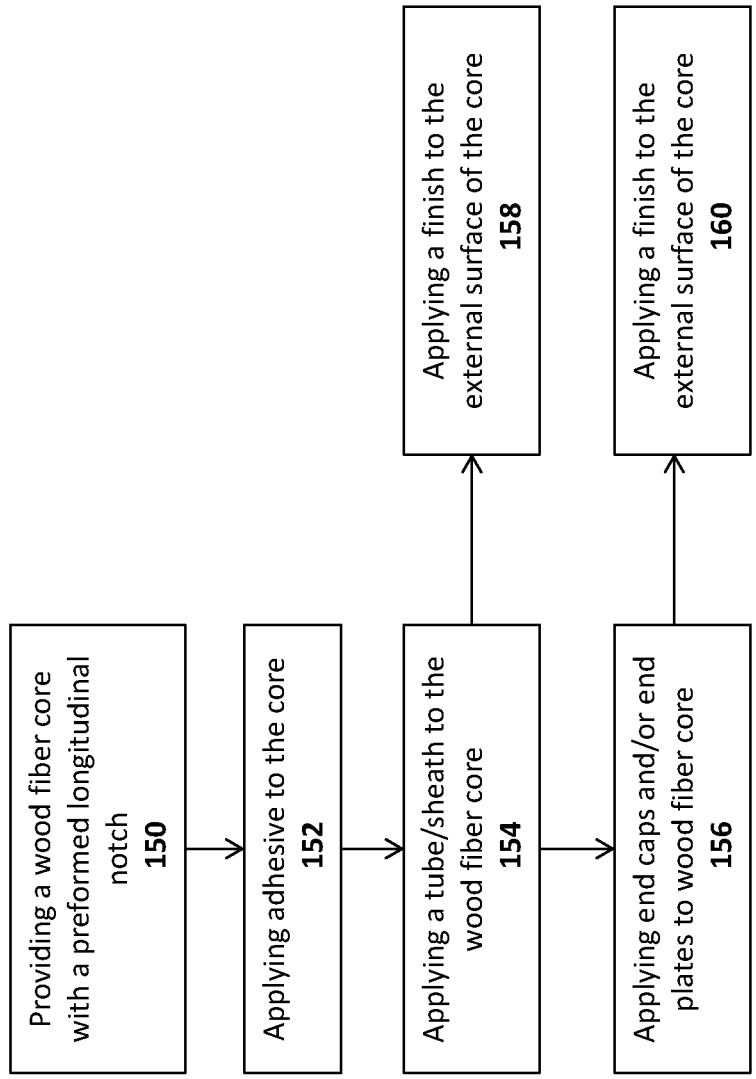
FIG. 7 is a flow chart for a method of making the wood fiber winding core that has a longitudinal notch preformed.

In one embodiment, the wood fiber core can be extruded such that a notch already exists within the wood fiber core 150 (FIG. 7). An adhesive may then be applied to the core 152 and a tube or sheath can then be applied to the wood fiber core with existing notch 154. The tube/sheath can be applied by splitting the tube/sheath longitudinally and affixing the tube/sheath to the core with a resin, glue, adhesive, or other similar like materials.

In embodiments using glues as adhesives, one or more may be applied to the exterior of the shell. Examples of glues that may be used are urethane glues, polyurethane glues, epoxy, wood glue, spray adhesive, cyanoacrylate glue, acrylic adhesives, or any comparable material. In such embodiments the glue will expand and form a stronger bond between wood fiber core and sheath.

In one embodiment, the wood fiber core with existing notch and tube/sheath can have end caps and plates applied to the ends of the wood fiber core 156. The end caps and plates can be made out of steel, sheet metal, plastic, carbon fiber, or any other similar material. The plate may have a square bore 50 (As seen in FIG. 3), a circular bore 52 (As seen in FIG. 4), a combined circle-square bore shape 54 (As seen in FIG. 5), termed, "squircle"; (a shape of bore of combined concentric and centered square and circle bores such that the circle's diameter is longer than the side of the square but smaller than that of the square's diagonal); or any similar shaped plate. The plate and end cap can be applied to the ends of the wood fiber core and tube/sheath with screws, nails, bolts, adhesives, or any comparable method or combination of methods.

In one embodiment, the wood fiber core with existing notch and tube/sheath may have a finish applied to the external surface 158. The finish can be polyurethane, linseed oil, tung oil, lacquer, shellac wax, or any similar finish or material. The finish can improve the core's resistance to water, dust, and friability. These advantages are not intended to be exhaustive, and are only provided to aid in understanding suitable materials for the finish.

In one embodiment, the wood fiber core with existing notch and tube/sheath can have end caps and plates applied to the ends of the wood fiber core, and then have a finish applied to the external surface 160. The finish can be polyurethane, linseed oil, tung oil, lacquer, shellac wax, or any similar finish or material. The finish can improve the core's resistance to water, dust, and friability. These advantages are not intended to be exhaustive, and are only provided to aid in understanding suitable materials for the finish.

In one embodiment, the wood fiber core includes all elements that are not mutually exclusive.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

What is claimed is:

1. A method for manufacturing a winding core, said method comprising:
providing an extruded wood fiber core member having an external diameter;
applying an expanding adhesive to said extruded wood fiber core member; and
sliding a sheath over said extruded wood fiber core member.

2. The method of claim 1 further comprising:
clamping said sheath to said extruded wood fiber core member and allowing said adhesive to cure.

3. The method of claim 1 further comprising:
cutting a longitudinal notch into said wood fiber core member and said sheath.

4. The method of claim 1 further comprising:
affixing end caps and plates to said wood fiber core member and said sheath.

5. The method of claim 4 further comprising:
applying a finish to an exterior surface of said sheath.

6. The method of claim 1 further comprising:
applying a finish to an exterior surface of said sheath.

7. The method of claim 1 wherein said sliding of the sheath over said extruded wood fiber core member uses an un-split tube.

8. The method of claim 1 wherein said wood fiber core has a square internal bore.

9. The method of claim 1 wherein said extruded wood fiber core has an internal bore having a circular cross section.

10. The method of claim 1 wherein said extruded wood fiber core has an internal bore having a squircle cross section.

11. The method of claim 1 wherein said sheath that is slid over the extruded wood fiber core member is longitudinally uncut.

12. The method of claim 1 further comprising using a mechanical mechanism to force said sheath to slide over said core member in the lengthwise direction of the sheath.

13. The method of claim 12 wherein said mechanical mechanism is a filament wrapped in a spiral configuration around said core.

14. The method of claim 12 wherein said mechanical mechanism is a ram configured to apply a force in the lengthwise direction of the sheath to cause relative sliding between the sheath and the extruded wood fiber core.

15. The method of claim 12 wherein said mechanical mechanism is pressurized air disposed between said sheath and said core.

* * * * *